(12) United States Patent
Schmidt et al.

(10) Patent No.: US 7,070,338 B1
(45) Date of Patent: Jul. 4, 2006

(54) METHOD OF OPTICALLY ALIGNING A WORKHOLDER FOR CONNECTOR GEOMETRY CONTROL AND IN-LINE MEASUREMENT CAPABILITY AND APPARATUS USED THEREFOR

(76) Inventors: Terrance J. Schmidt, 2301 Logan Rd., Ocean, NJ (US) 07712; Cuneyt Erdogan, 25 Magellan Way, Franklin Park, NJ (US) 08823; Alfred J. Cheswick, 104 Ocean Ave., Loch Arbour, NJ (US) 07711

( * ) Notice: Subject to any disclaimer, the term of this patent is extended or adjusted under 35 U.S.C. 154(b) by 0 days.

(21) Appl. No.: 11/026,698

(22) Filed: Dec. 31, 2004

(51) Int. Cl.
*G02B 6/36* (2006.01)

(52) U.S. Cl. ....................................................... 385/85
(58) Field of Classification Search ................... 385/85
See application file for complete search history.

(56) References Cited

U.S. PATENT DOCUMENTS

| | | | | |
|---|---|---|---|---|
| 6,157,863 | A * | 12/2000 | Chandler et al. | 700/56 |
| 6,215,555 | B1 * | 4/2001 | Chivers | 356/512 |
| 6,488,567 | B1 * | 12/2002 | Flanders et al. | 451/6 |
| 6,736,702 | B1 * | 5/2004 | Minami | 451/8 |
| 2002/0131723 | A1 * | 9/2002 | Kolasinski et al. | 385/85 |
| 2003/0227634 | A1 * | 12/2003 | Kobayashi et al. | 356/508 |
| 2004/0179788 | A1 * | 9/2004 | Fleenor et al. | 385/79 |

OTHER PUBLICATIONS

ZX-1 Interferometer Specification Sheet. Manufactured by Direct Optical Research Company, Phoenix, AZ.
OFL-12 Mass Production Connector Polisher Specification Sheet. Manufactured by Seiko Instruments, Torrance. CA.
Randys 2000 Fiber Optic Polishing Machine Specification Sheet. Manufactured by RTD MFG, San Jose, CA.

* cited by examiner

*Primary Examiner*—Sung Pak
*Assistant Examiner*—Chris Chu (57) ABSTRACT

An apparatus, integral to a polishing fixture, that enables a plurality of fiber optic connectors to be independently aligned to a polishing surface. Once inserted into the apparatus, a reference connector is positioned over an optical interferometer, whose focal plane is parallel with that of the polishing surface plane. The apparatus is then adjusted to the known interferometric geometry of the reference connector. This procedure is performed for each integral apparatus insuring that all consecutive connectors inserted into said apparatus are polished to the same interferometric geometry as that of the reference connector. The same apparatus also permits connector geometries to be measured by the interferometer while the connectors are mounted in the polishing fixture.

14 Claims, 7 Drawing Sheets

METHOD OF OPTICALLY ALIGNING A WORKHOLDER FOR CONNECTOR GEOMETRY CONTROL AND IN-LINE MEASUREMENT CAPABILITY AND APPARATUS USED THEREFOR

FIELD OF THE INVENTION

The present invention generally relates to a method and to devices enabling the alignment of optical connectors to a desired orientation with reference to a polishing surface and the focal plane of an optical measurement device.

BACKGROUND OF THE INVENTION

Fiber optic connectors are used to link various optical components, cable assemblies, transmission devices and testing equipment. To insure low loss and low reflective performance, a connector's precision ferrule, in which the fiber is mounted, must be polished to a scratch-free finish with demanding geometric criteria.

The ferrule tip of most high performance connectors is polished to a convex geometry. Ideally, the apex of the convex surface should coincide with the center axis of the fiber. The deviation from this ideal geometry is referred to as the connector's apex offset. Apex offset is created when the ferrule endface is not held perpendicular to the abrasive surface used during the polishing process. An interferometer is a commonly used test instrument that can measure apex offset through the analysis of interference patterns created by light reflected off of the ferrule and fiber endface.

Prior art has demonstrated that equipment has been developed to automatically polish connectors. These polishers utilize precisely machined workholders in which connectors are inserted. The workholder is then engaged with a support bracket and positioned so that the connector's ferrules are placed in contact with a rotating polishing surface. The degree of perpendicularity maintained between the ferrule axis and the polishing surface is highly dependent upon the polisher's mechanical assembly, machined parts' tolerances, and workholder/polisher engagement mechanism. These variables compound upon each other resulting in increased apex offset error.

Prior art also has a significant shortcoming regarding the control of apex offset. Most automated polishers are designed to support the simultaneous processing of a plurality of connectors. Hence the workholder is machined with a multitude of connector ports. There always exists a machining tolerance from port to port, a variable that will be reflected in differing apex offsets. These ports are fixed and cannot be adjusted for individual connectors.

An additional shortcoming of prior art is the method in which connectors are secured within the workholder. Connectors are slip fitted into bushings or sleeves and locked into position. Because of dimensional tolerance differences between the outer diameter of the connector ferrule and the inner diameter of the bushing/sleeve, the locking means tilts the ferrule creating additional apex offset.

A further shortcoming of prior art is that polisher workholders are machined and mechanically assembled. The connector orientation cannot be adjusted with an interferometric reference. Therefore the workholder cannot be utilized for in-line interferometric inspection of connectors that are secured in the workholder.

SUMMARY OF THE INVENTION

Therefore, it is the objective of the invention to provide a means of minimizing the apex offset of a plurality of connectors residing in a workholder, by independently aligning the connectors so they all will be perpendicular to an abrasive surface during a polishing process.

An advantage of the present invention is that it provides a workholder fixture that permits the optical alignment of an individual connector port with an interferometric reference. Such alignment guarantees that any ferrule inserted in the connector port will be held perpendicular to a polishing surface for minimal apex offset.

Still another advantage of the present invention is that the said optical alignment is performed after the workholder is secured in the polishing machine. This compensates for any compounding of machining tolerances and assembly misalignment throughout the polisher's mechanical structure.

A further advantage of the present invention is that the said optical alignment is performed after a reference connector is secured and locked in the workholder. This compensates for ferrule tilting due to dimensional tolerance variability between the ferrule's outer diameter and the bushing/sleeve inner diameter, thus eliminating potential contribution to apex offset.

An additional advantage of the present invention is that a plurality of connector ports contained in a single workholder can be optically aligned independent of each other. This permits mass polishing of multiple connectors while controlling geometric criteria at every connector port.

Another advantage of the present invention is that an apex offset for each connector can be intentionally induced for experimental and process development applications.

Since the present invention results in polishing ports that have been optically aligned by an interferometer, polished connectors can be inspected for interferometric compliance while they are still secured in the workholder. This eliminates the need to remove a polished connector from the workholder and transfer it to a separate interferometric testing station for analysis.

Other advantages of the invention will become apparent upon reading the following detailed description and upon reference to the accompanying drawings.

DESCRIPTION OF FIGURES

For a more complete understanding of this invention, reference should now be had to the embodiments illustrated in greater detail in the accompanying drawings and described below by way of examples of the invention.

DETAIL DESCRIPTION OF THE PREFERRED EMBODIMENT

While the invention will be described in connection with the preferred embodiment, it will be understood that it is not intended to limit the invention to that embodiment. On the contrary, it is intended to cover all alternatives, modifications and equivalents as may be included within the spirit scope of the following description.

Figure 1:
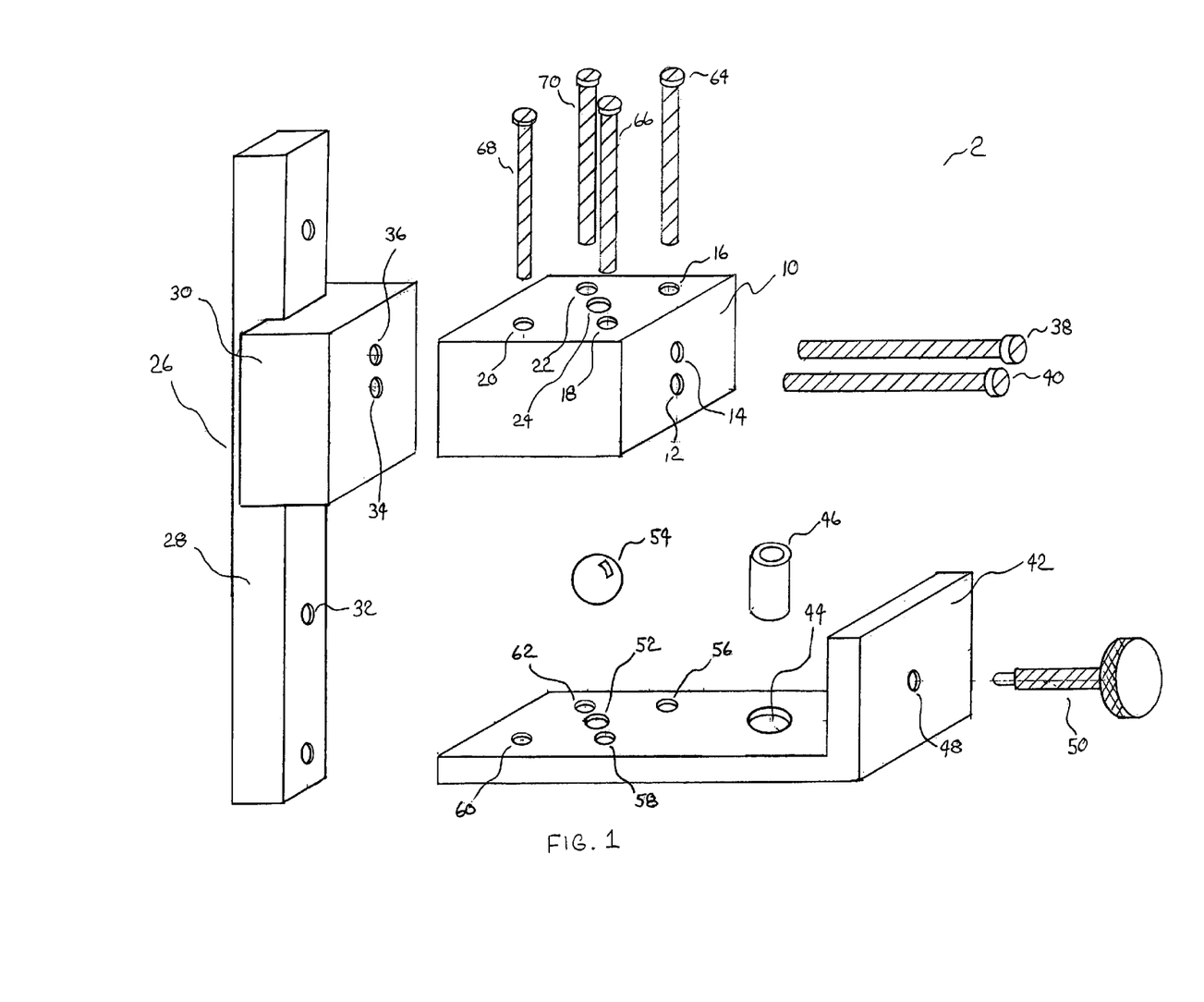
FIG. 1 is an exploded view of a connector port.

Referring to FIG. 1, apparatus 1 is comprised of a connector port 2. Connector port 2 is provided with a leveling block 10. Leveling block 10 is formed with through holes 12, 14, 16, 18, 20, 22 and 24. Suitable materials for leveling block 10 are stainless steel, aluminum and other metals. Stainless steel is preferred. A linear slide 26 is provided with a rail 28 and a carriage 30. Commercially available linear slides are suitable for linear slide 26, including those available from American Linear Manufacturers (Westbury, N.Y.) with part number LWL5+70. Rail 28 is formed with a plurality of through holes 32 along its length. Carriage 30 is formed with threaded holes 34 and 36. Screws 38 and 40 are inserted into through holes 14 and 12, and engage with threaded holes 36 and 34, respectively.

A leveling plate 42 is formed into an L-shaped bracket. Suitable materials for leveling plate 42 are stainless steel, aluminum and other metals. Stainless steel is preferred. Leveling plate 42 is formed with a through hole 44. The diameter of through hole 44 is of sufficient diameter so as to accept the press fitting of a bushing 46. Bushing 46 is press fit into through hole 44 until it is flush with the bottom surface of leveling plate 42. Suitable materials for bushing 46 include carbide, stainless steel, zirconia and other ceramics. Zirconia is preferred. Commercially available bushings include those supplied by MicroLap, Inc. (Rolla, N. Dak.) having part number JA2842000. Suitable bonding means between bushing 46 and through hole 44 is adhesives and arc welding. Adhesives are preferred. The inner diameter of bushing 46 is of sufficient size to accept the slip fitting of commercially available fiber optic connectors and ferrules.

Leveling plate 42 is formed with a threaded through hole 48 of sufficient diameter to accept the engagement of a spring plunger 50.

Leveling plate 42 is formed with a through hole 52. The diameter of through hole 52 is equivalent to that of through hole 24. A sphere 54 is formed with a diameter of sufficient size to permit sphere 54 to rest upon through hole 52. Suitable materials for sphere 54 include carbide, stainless steel, hardened steel and other metals. Stainless steel is preferred.

Figure 2:
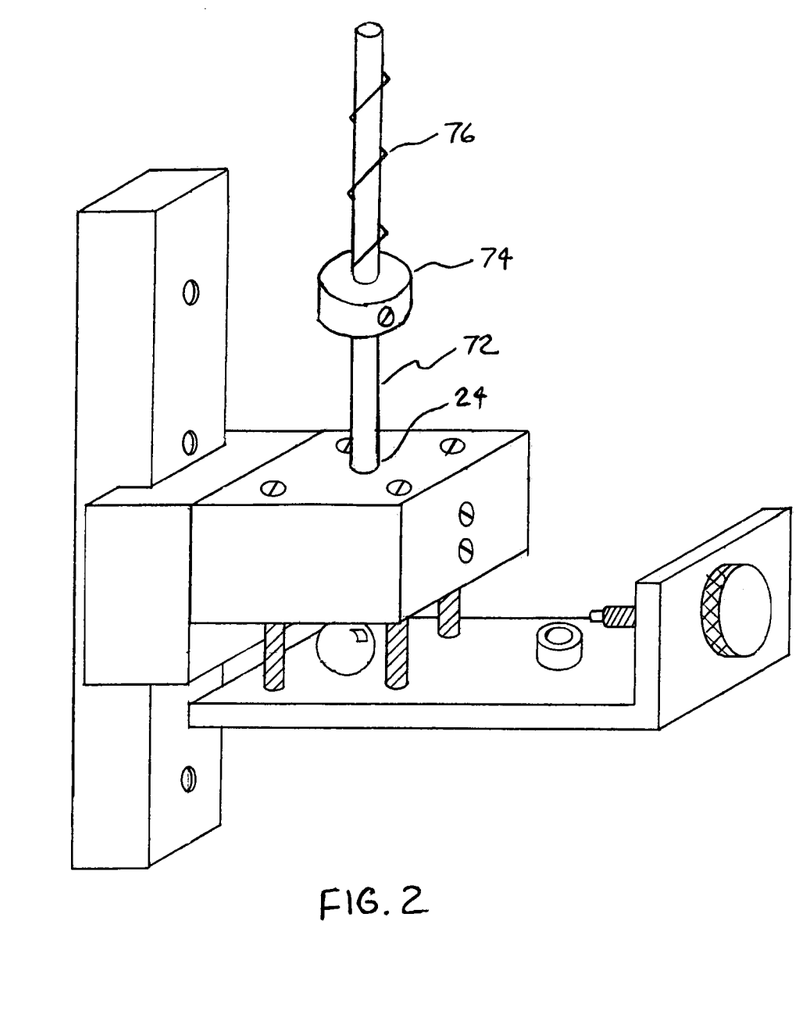
FIG. 2 is the view of an assembled connector port.

Leveling plate 42 is formed with threaded holes 56, 58, 60 and 62. Relative locations between threaded holes 56, 58, 60 and 62 are identical to the relative locations of through holes 16, 18, 20 and 22. Set screws 64, 66, 68 and 70 are inserted into through holes 16, 18, 20 and 22, engaging with threaded holes 56, 58, 60 and 62. This engagement confines sphere 54 between through hole 52 and through hole 24 as illustrated in FIG. 2.

Again referring to FIG. 2, a shaft 72 is press fit into through hole 24 and bound. Binding means include adhesives and arc welding. Adhesives are preferred. Suitable materials for shaft 72 include stainless steel and carbide. Carbide is preferred. A lock collar 74 is secured upon shaft 72. A compression spring 76 is placed over shaft 72 and rests upon lock collar 74.

Figure 3:
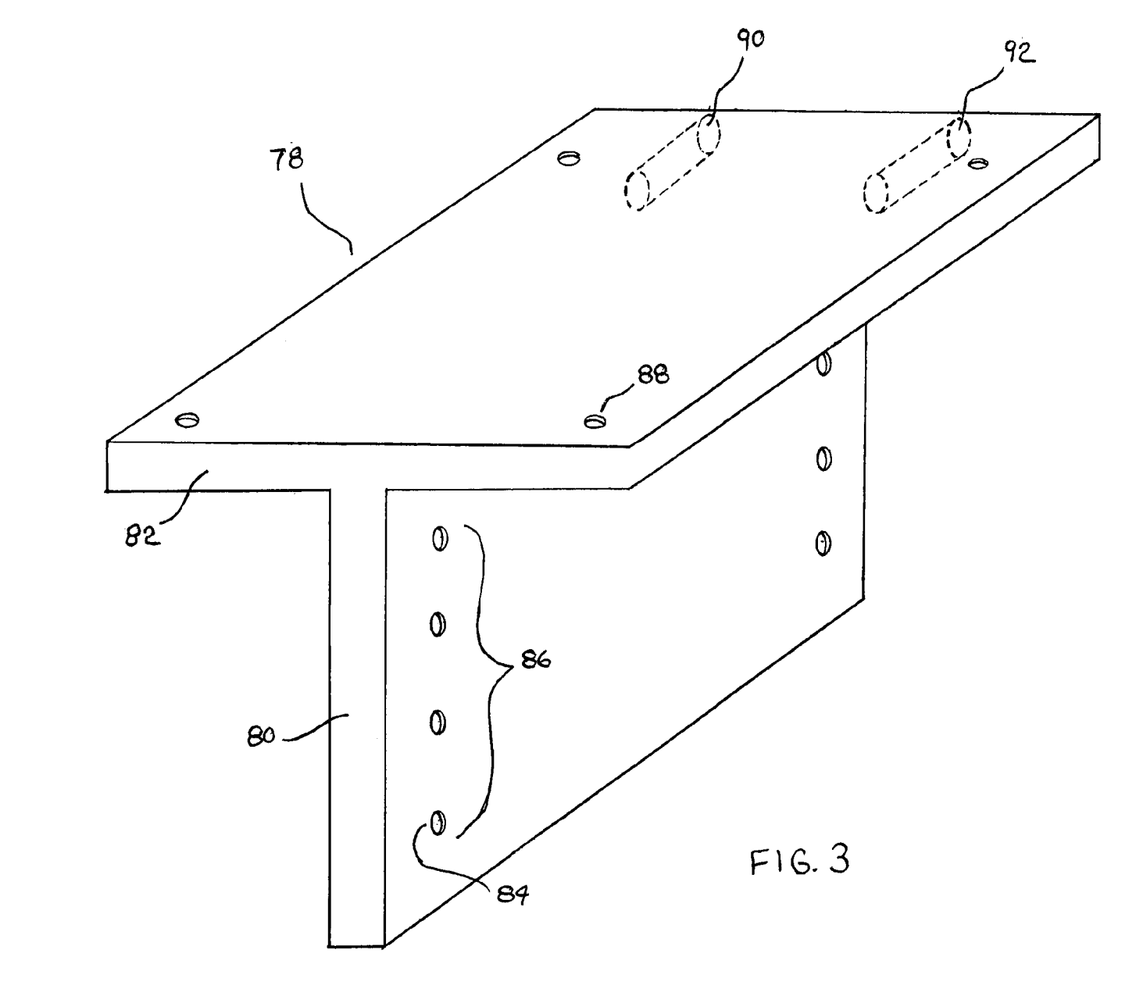
FIG. 3 is a workholder blank capable of supporting a plurality of connector ports.

Referring to FIG. 3, a workholder blank 78 is presented. Blank 78 is fabricated into a T-shape form. Suitable materials for blank 78 are stainless steel, aluminum and other metals. Aluminum is preferred. Blank 78 has a vertical component 80 and a horizontal component 82. Vertical component 80 is formed with a plurality of threaded holes 84. Threaded holes 84 are aligned into a plurality of rows 86.

Horizontal component 82 is formed with plurality of through holes 88. The positions of through holes 88 are such that they lay in the same planes of rows 86. Horizontal component 82 is also formed with two holes 90 and 92.

Figure 4:
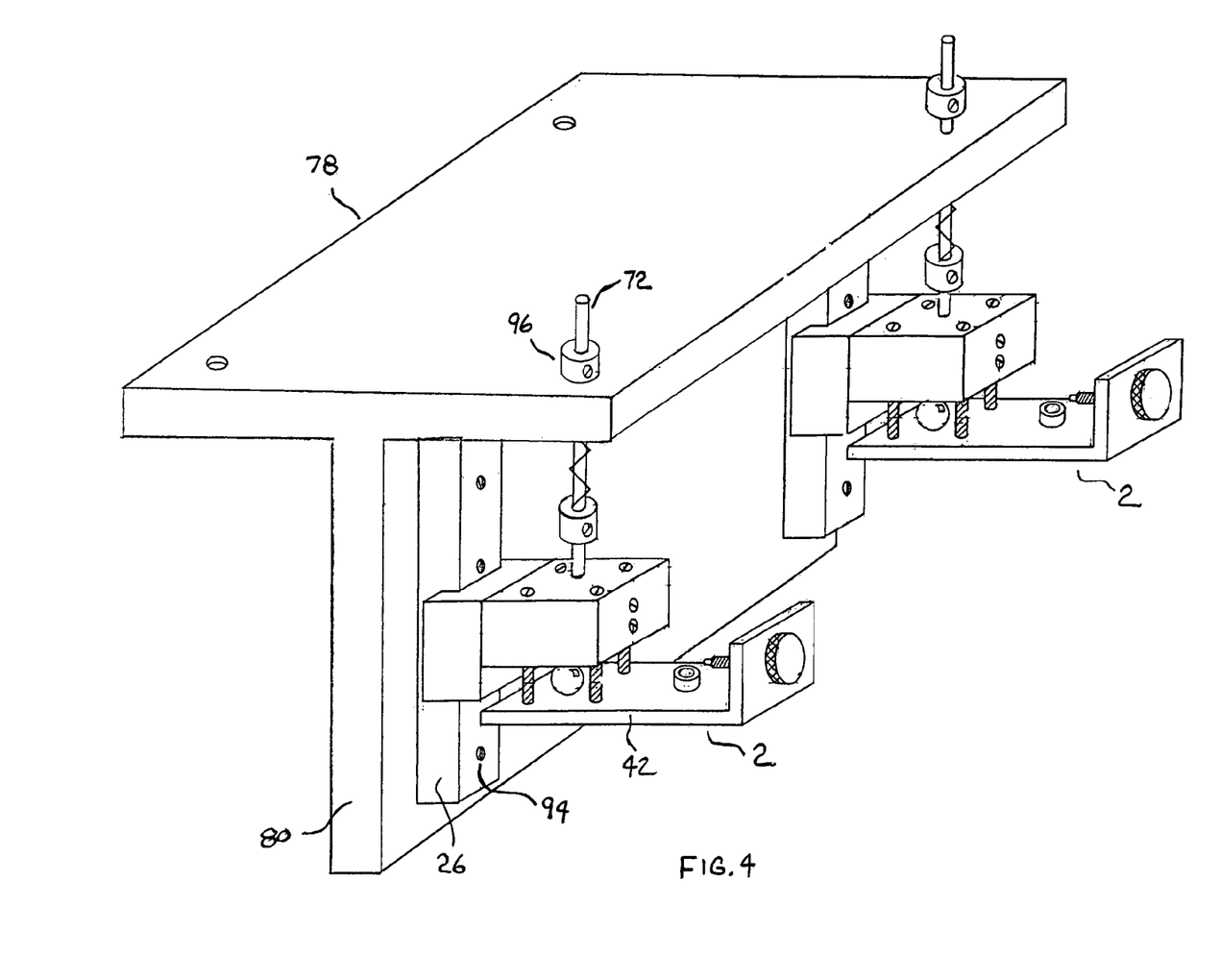
FIG. 4 illustrates a workholder blank with a plurality of connector ports mounted thereon.

Referring to FIG. 4, a plurality of connector ports 2 is mounted to workholder blank 78. Shaft 72 is inserted into through hole 88. Linear slide 26 is secured to workholder blank 78 with a plurality of screws 94 that engage with threaded holes 84. A lock collar 96 is slipped over shaft 72 and secured. The locking position of lock collar 96 can be varied along the length of shaft 72, such as to position leveling plate 42 below or above the bottom surface of horizontal component 80. FIG. 4 illustrates lock collar 96 secured upon shaft 72 so as to position leveling plate 42 above the bottom surface of horizontal component 80.

Figure 5:
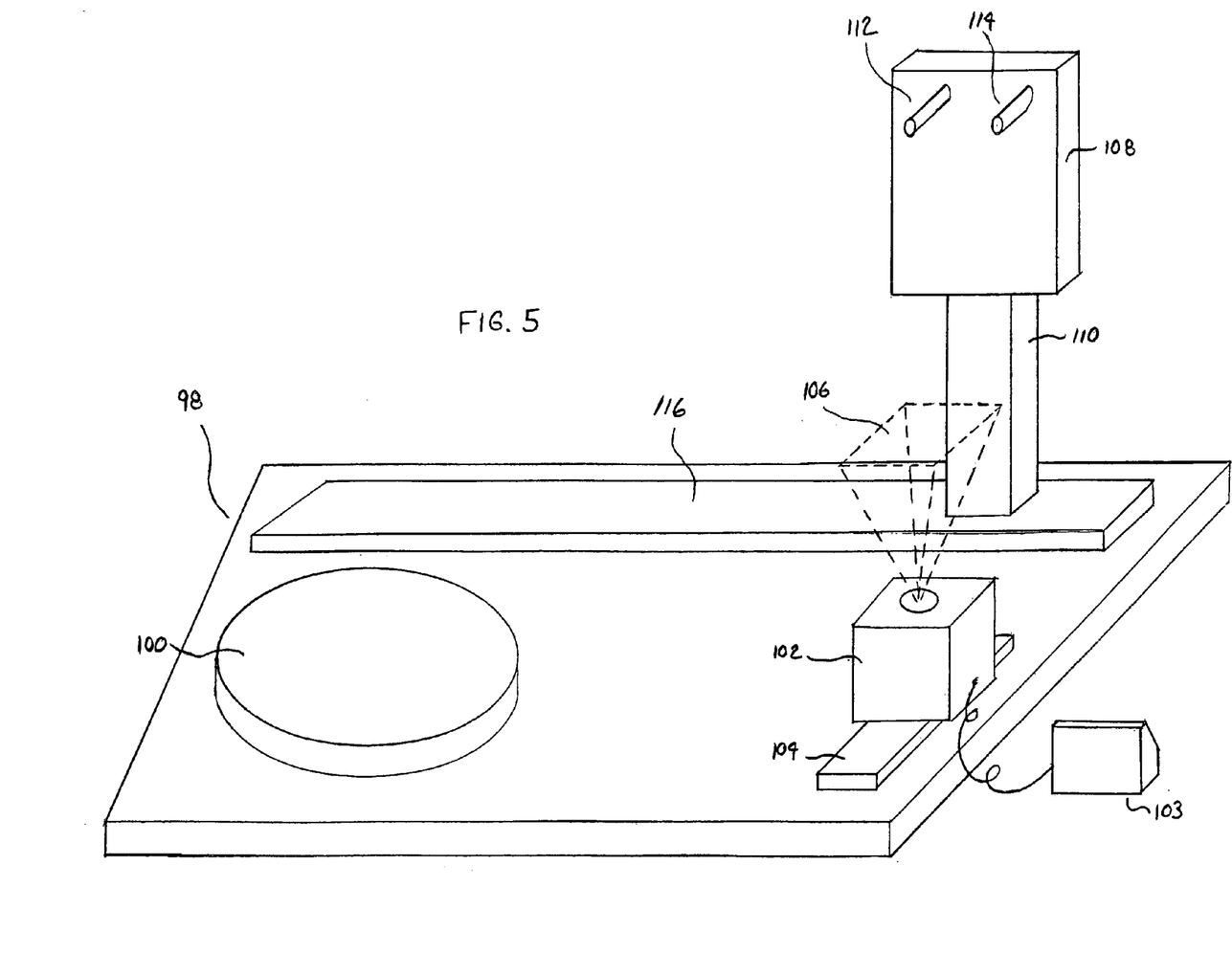
FIG. 5 depicts a polishing machine with its polishing disk, and an interferometer mounted thereon.

The operation of apparatus I will now be described. Referring to FIG. 5, a fiber optic connector polisher 98 is presented. Suitable polishers include the Icon Workcell (part number IC-3001) manufactured by Krell Technologies, Inc. (Morganville, N.J.). Polisher 98 consists of a plurality of polishing disks 100 and an interferometer 102 that is secured upon a Y-axis linear slide 104. Suitable interferometers include the SpecMap™ supplied by the aforementioned Krell Technologies, Inc. (part number SMP-IC). A monitor 103 displays images generated by interferometer 102. An optical focal plane 106 of interferometer 102 is parallel to the plane created by the diameters of polishing disks 100.

Figure 6:
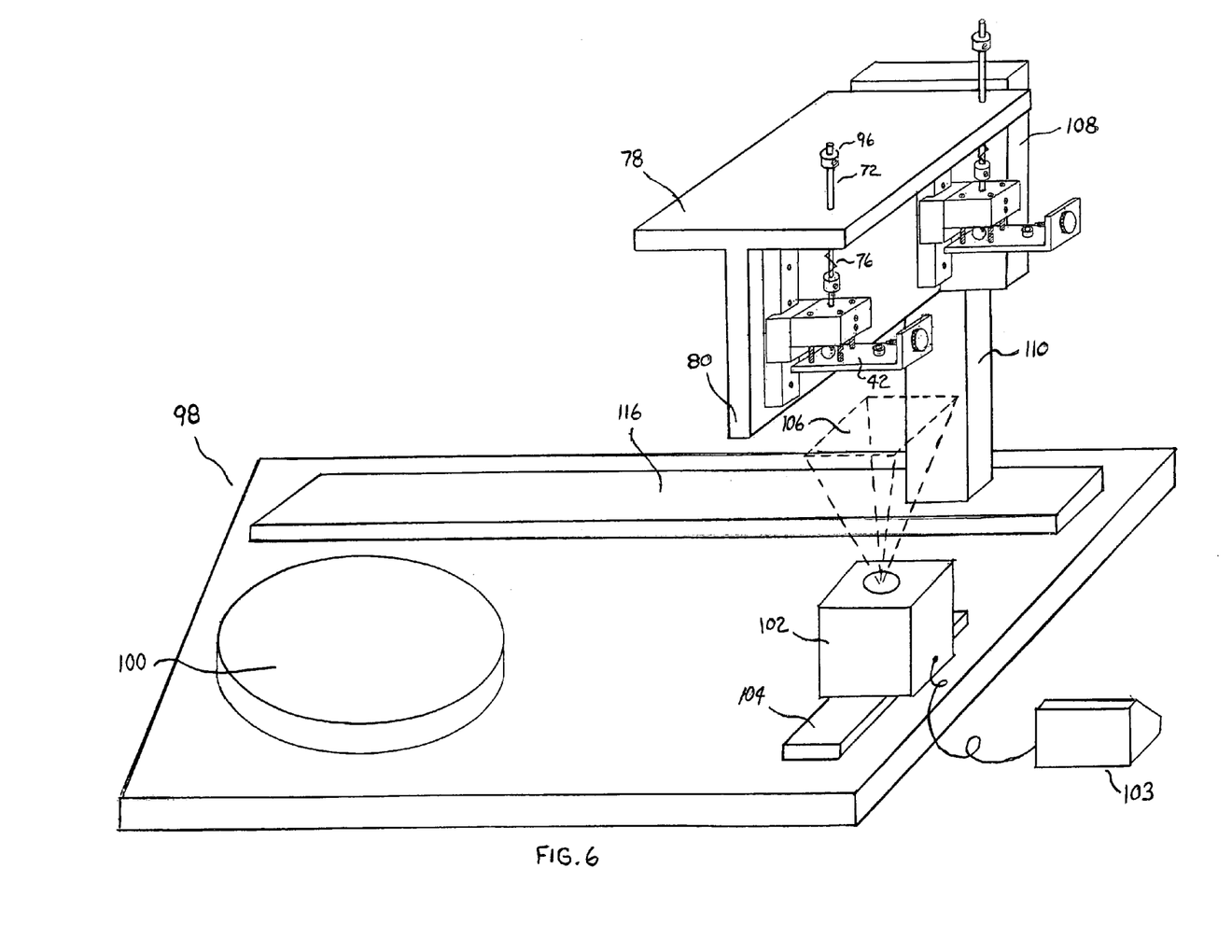
FIG. 6 illustrates the engagement of an assembled workholder with the polishing machine. It also depicts linear slide transfer means for the workholder between the interferometer and polishing disk.

Polisher 98 also consists of a Z-axis linear slide 110 that is mounted upon an X-axis linear slide 116. A workholder mount 108 is secured to Z-axis linear slide 110. Two dowel pins 112 and 114 protrude from workholder mount 108. Workholder blank 78 is secured to workholder mount 108 via the engagement of holes 90 and 92 with dowels 112 and 114 as illustrated in FIG. 6.

Again referring to FIG. 6, lock collar 96 is positioned upon shaft 72 so as to permit the lower surface of leveling plate 42 to fall below the bottom surface of vertical component 80 upon release of tension in compression spring 76. FIG. 6 illustrates compression spring 76 in a compressed state.

X-axis linear slide 116 and Z-axis linear slide 110 have ranges of travel that allow the bottom surface of leveling plate 42 to be positioned in focal plane 106 and make physical contact with polishing disks 100.

Figure 7:
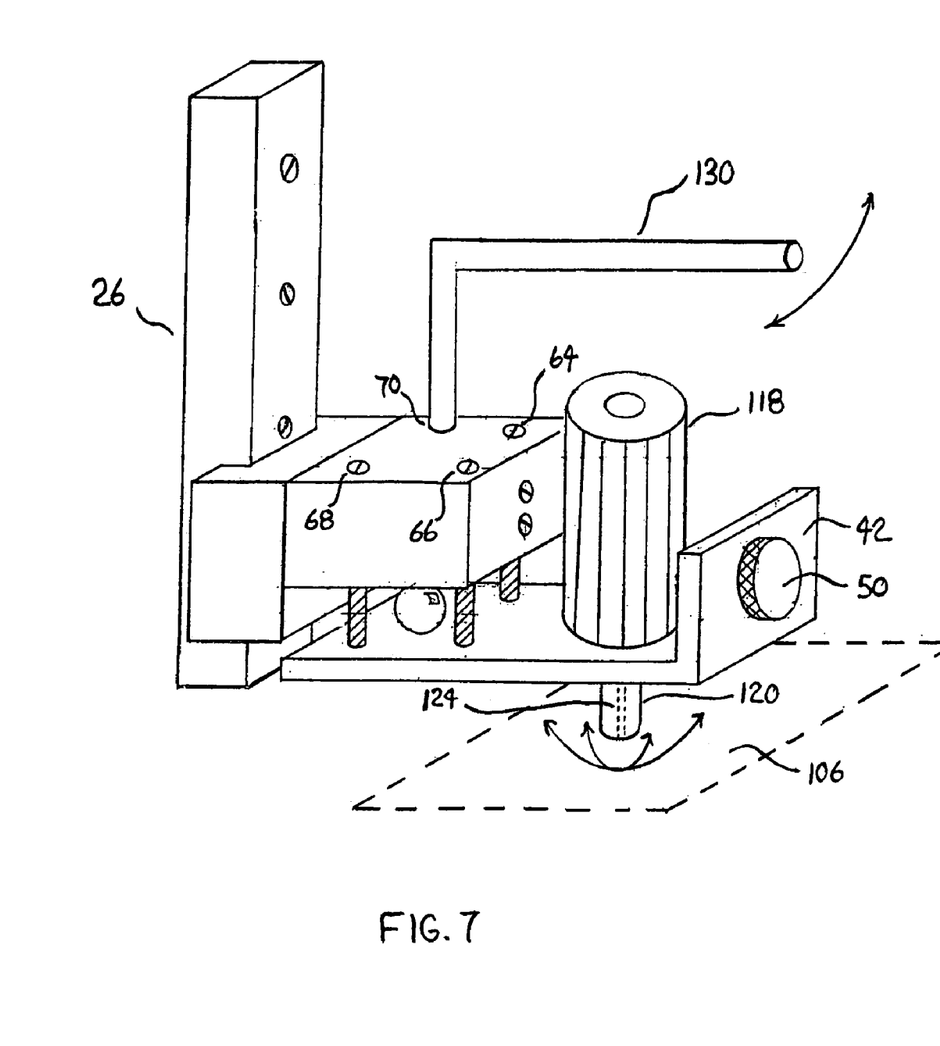
FIG. 7 depicts a fiber optic connector inserted into a connector port. It also illustrates the method of adjusting a connector port so the reference connector is properly aligned interferometrically.
Figure 7A:
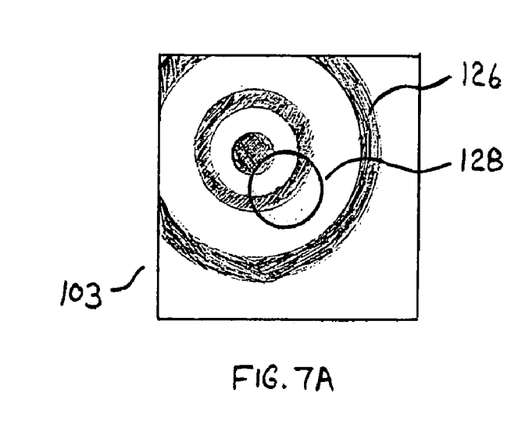
FIG. 7A illustrates the interferometric fringe pattern of the reference connector before connector port alignment.
Figure 7B:
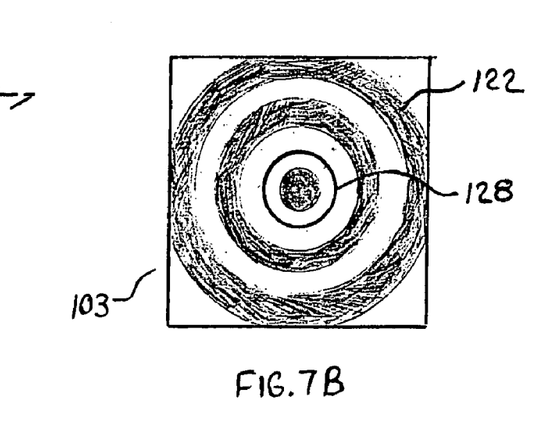
FIG. 7B illustrates the true and inherent apex offset of the reference connector. It also depicts the desired interferometric pattern after alignment of the reference connector in the connector port.

Referring to FIG. 7 and FIG. 7B, a commercially available reference fiber optic connector 118 with a known interferometric fringe pattern 122 is inserted into bushing 46 and secured into position by locking spring plunger 50. Connector 118 consists of a ferrule 120 that protrudes beneath the bottom surface of leveling plate 42. A fiber 124 is centered in ferrule 120. For illustrative clarity, shaft 72 and through hole 24 are not displayed.

X-axis linear slide 116 and Z-axis linear slide 110 are manipulated to position the endface of ferrule 120 and fiber 124 into focal plane 106. Referring to FIG. 7A, the resulting initial fringe pattern 126 and a fiber image 128 of fiber 124 is displayed on monitor 103. Due to assembly misalignment, the adhesive interface between bushing 46 and through hole 44, and machining tolerances of leveling block 10, linear slide 26, workholder blank 78, workholder mount 108, Z-axis linear slide 110 and X-axis linear slide 116, the vertical center axis of ferrule 120 is not perpendicular with focal plane 106. This misalignment is represented by the offset of initial fringe pattern 126 relative to fiber image 128.

Using a screwdriver tool 130, set screws 64, 66, 68 and 70 are adjusted to change the pitch and yaw of leveling plate 42 and therefore ferrule 120 and fiber 124. During this procedure, X-axis linear slide 116 and Y-axis linear slide 104 are manipulated to maintain fiber image 128 in the center of the display of monitor 103. Upon attaining known interferometric fringe pattern 122 through the adjustment of set screws 64, 66, 68 and 70, the center axis of ferrule 120 is now perpendicular with both focal plane 106 and the plane created by the diameters of polishing disks 100. This procedure is repeated for each leveling plate 42 contained in apparatus 1.

All connector ports 2 are now properly aligned for the polishing of commercially available fiber optic connectors. Additionally, after a polishing process is completed, the connectors are properly aligned within their respective connector ports 2 to focal plane 106 for accurate interferometric measurements using interferometer 102.

We claim:

1. A polishing fixture and a method of alignment of said polishing fixture, comprising:
   a base structure, said base structure formed to interface with a polishing machine;
   a plurality of positioning means disposed upon said base structure, said positioning means having an independent suspension and being perpendicularly moveable into a focal plane of an interferometer and into contact with a plurality of polishing means;
   a leveling means disposed upon said positioning means, said leveling means having an adjustable pitch and a yaw in reference to said focal plane of said interferometer and said polishing means;
   an insert means disposed upon said leveling means, said insert means formed to secure an optical component.

2. The polishing fixture of claim 1 wherein said positioning means is a linear slide, said independent suspension of said positioning means being regulated by a compression spring.

3. The polishing fixture of claim 2 wherein said compression spring creates a pressure between said optical component and said polishing means when said optical component and said polishing means are in contact.

4. The polishing fixture of claim 1 wherein said positioning means locates said optical component into said focal plane of said interferometer and into contact with said polishing means.

5. The polishing fixture of claim 1 wherein said leveling means comprises a gimbal mechanism, said gimbal mechanism comprising a sphere captured between a pair of bodies, a planarity between said bodies adjustable by a plurality of set screws.

6. The polishing fixture of claim 5 wherein said adjustment of said set screws orients said optical component with respect to said focal plane of said interferometer and said polishing means.

7. The polishing fixture of claim 1 wherein said insert means is a bushing having an appropriate dimension to accept an insertion of said optical component.

8. The polishing fixture of claim 1 wherein said plurality of polishing means are grinding surfaces, said grinding surfaces disposed upon said polishing machine.

9. A polishing fixture, and a method of orienting a plurality of optical components residing in said polishing fixture with reference to a focal plane of an interferometric system and a polishing surface, comprising:
   a base structure, said base structure formed for engagement with a polishing machine;
   a plurality of positioning means disposed on said base structure, said positioning means having a travel range sufficient for locating said optical components into said focal plane of said interferometric system and into contact with said polishing surface;
   an independent suspension means disposed upon said positioning means;
   a gimbal means disposed on said positioning means, said gimbal means comprised of a sphere captured by an upper body and a lower body, a planarity of said lower body being adjustable with reference to said focal plane of said interferometric system and said polishing surface;
   a holding means disposed upon said lower surface of said gimbal means, said holding means securing a optical component.

10. The polishing fixture of claim 9 wherein said independent suspension means comprises a spring.

11. The polishing fixture of claim 10 wherein said spring induces a pressure between said optical component and said polishing surface upon contact between said optical component and said polishing surface.

12. The polishing fixture of claim 9 wherein said adjustment of said planarity of said lower body orients said optical component in reference to said focal plane of said interferometer and said polishing surface.

13. The polishing fixture of claim 12 wherein a manipulation of a plurality of set screws provides said adjustment.

14. The polishing fixture of claim 9 wherein said holding means comprises a bushing formed for an insertion of said optical component.

* * * * *